April 29, 1952 E. H. ROSS 2,594,807

VOICE-OPERATED CONSTANT-LEVEL AMPLIFIER

Filed May 3, 1949 2 SHEETS—SHEET 1

INVENTOR.
EDMUND H. ROSS

BY

ATTORNEY

VOICE-OPERATED CONSTANT-LEVEL AMPLIFIER

Filed May 3, 1949 2 SHEETS—SHEET 2

*INVENTOR.*
EDMUND H. ROSS

*BY* [signature]

ATTORNEY

Patented Apr. 29, 1952 2,594,807

UNITED STATES PATENT OFFICE 2,594,807

VOICE-OPERATED CONSTANT-LEVEL AMPLIFIER

Edmund H. Ross, Chicago, Ill., assignor to Automatic Electric Laboratories, Inc., Chicago, Ill., a corporation of Delaware Application May 3, 1949, Serial No. 91,157

5 Claims. (Cl. 179—171)

This invention relates to a voice frequency amplifying device and more particularly to such a device wherein voice frequency amplification is brought to a particular predetermined level irrespective of the strength of the incoming voice signal.

Constant level voice amplifying devices have been known previously. Such devices are used in connection with radio telephone systems employing the well known Western Electric Company G-2 control terminal. These amplifiers include, among other parts, a gain increaser circuit, a gain decreaser circuit, and means for adjusting these circuits to the proper outgoing voice level. Once the voice level is manually set, adjustment to the proper level is maintained by means responsive to the level of the incoming voice signal. These amplifiers are of use in applications where it is desirable to change an incoming voice signal to a predetermined level.

It is an object of the invention to provide a voice signal device which will give a constant level output when input voice levels vary considerably.

Another object of the invention is to provide a device for raising a voice signal to a constant output when the signal has originated from an interurban or long urban exchange line and the voice level must be raised to the proper value for retransmission by a radio transmitter or repeated to another line.

A further object of the invention is to provide a device which will maintain a constant voice output level irrespective of the level of the incoming signal.

A feature of the invention relates to the use of a transformer of the hybrid winding type as a mutual inductance bridge in the circuit of an amplifier.

Another feature of the invention is the use of a vibrating relay to indicate the need for balancing the circuits of the gain increasing and gain decreasing elements of a constant level amplifier.

A further feature of the invention is the use of a diode rectifier to give voltage-doubling rectifier action in the gain increaser circuit of the apparatus.

Other objects and features will become apparent from the following specification together with the accompanying drawings which show a proposed embodiment by way of example.

Figure 1:
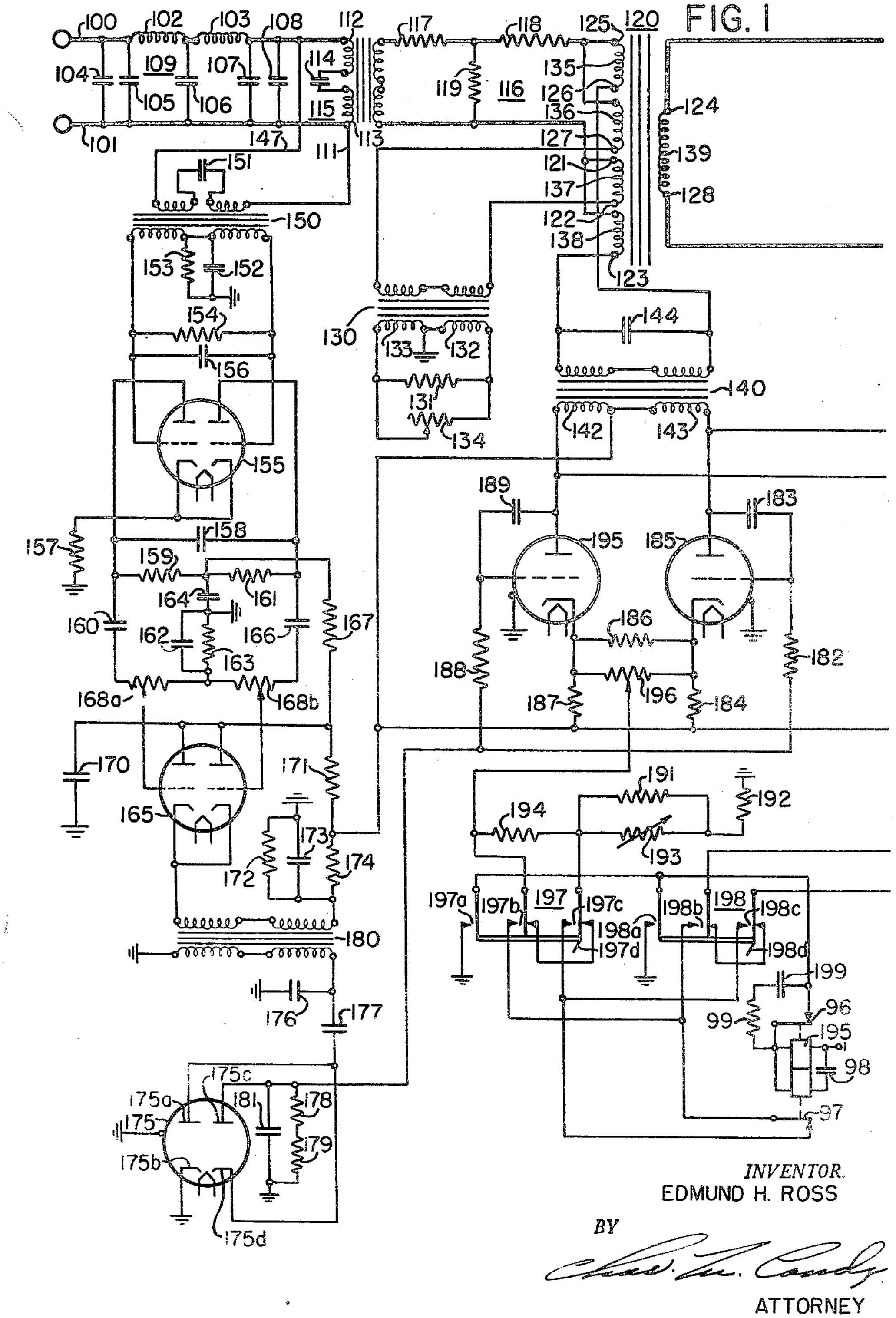
Figure 2:
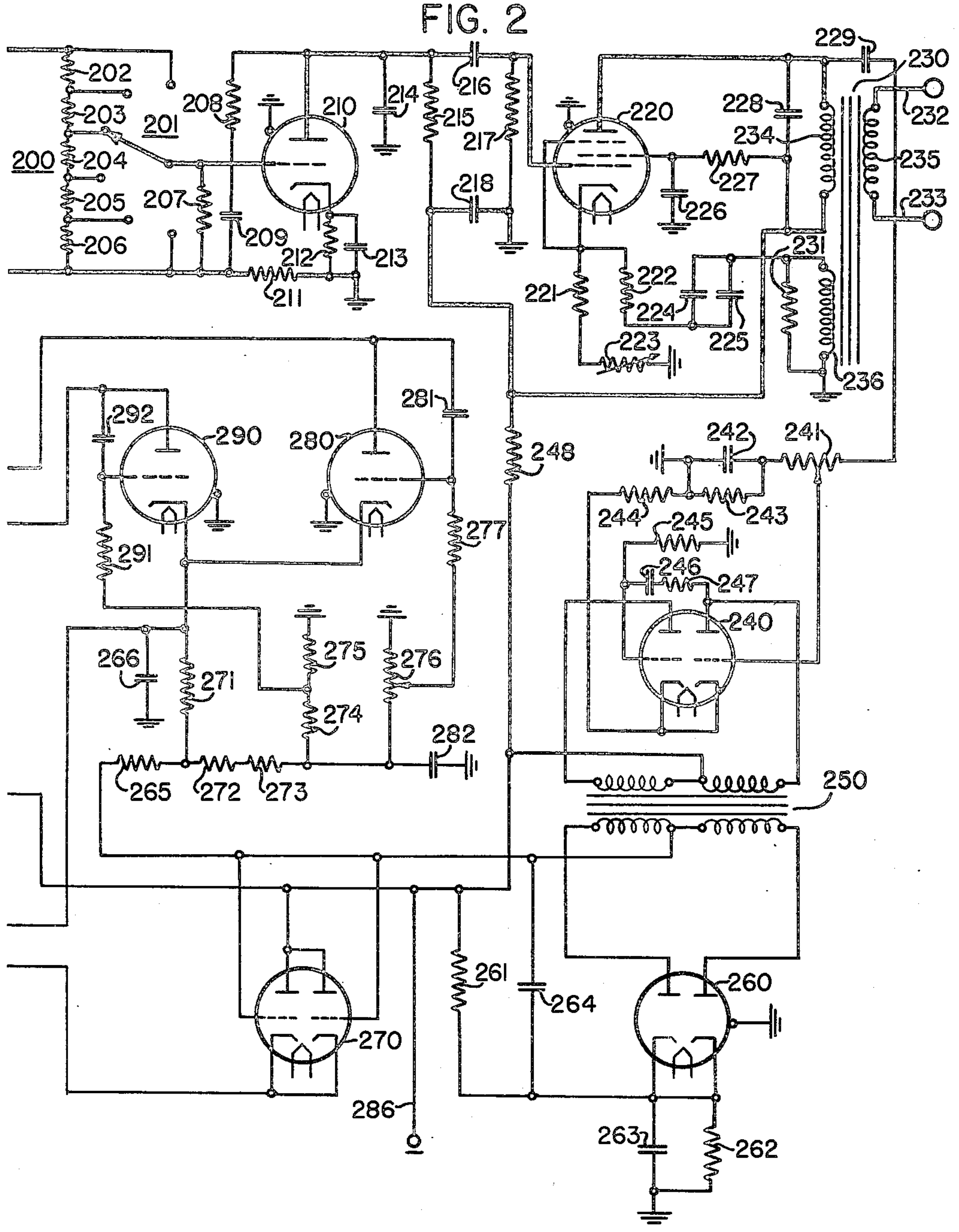

The invention is disclosed in two sheets of drawings comprising Figs. 1 and 2. The drawings are arranged to be placed side-by-side with Fig. 1 at the left in order to line up the connecting parts. Figs. 1 and 2 are schematic diagrams showing the arrangement of tubes, capacitors, resistors, and transformers which are part of the amplifier circuit.

The circuit shown consists essentially of a variable transmission circuit element in the form of a mutual inductance bridge; an output amplifier to adjust the level from the variable gain circuit; a gain increaser element including a voice frequency amplifier, gain adjusting control, signal rectifier, control bias rectifier, a pair of variable plate resistance tubes to set the transmission gain of the variable circuit, and a level setting or threshold control; a gain decreaser element including a voice frequency amplifier, a level setting or threshold control, a control bias rectifier, a direct current phase inverter, and a pair of variable plate resistance tubes to set the transmission loss of the variable gain circuit; a power supply furnishing filament and high voltage plate supply power to operate the vacuum tubes in the previously mentioned elements; and a balancing circuit for adjusting operation of the gain increaser and gain decreaser elements for proper plate current balance to prevent signal degradations that might appear in the output.

*Variable gain circuit*

Incoming signals enter from a source (not shown) through leads 100 and 101 of Fig. 1. The signals are passed through a low-pass filter 109 comprising inductances 102 and 103 and capacitances 104, 105, 106, 107 and 108. This low-pass filter has a cut-off frequency of 3000 cycles per second.

The signals are then passed through a high-pass filter 115 comprising inductors 112 and 113 and capacitor 114. This high-pass filter has a cut-off frequency of 200 cycles per second.

The signals are transformer connected through an attenuator pad 116 composed of resistors 117, 118 and 119 to a special transformer 120 connected as a mutual inductance bridge.

The mutual inductance transformer 120 comprises five windings 135, 136, 137, 138, and 139. Windings 135 and 136 are connected in parallel to one of the incoming conductors and windings 137 and 138 in parallel to the other. The end of winding 135 is connected to the end of winding 138 through a balancing impedance transformer 140 and winding 136 is similarly connected to winding 137 through a balancing impedance transformer 130. These windings are connected in opposition to each other so that the inductive effect of one winding tends to cancel the inductive effect of the other. When the windings are in balance, transmission of the signal through winding 139 is at the minimum gain. By providing a method of balancing or unbalancing the windings, the transmission level may be controlled.

The balance of the mutual inductance bridge 120 is determined by the impedance presented to its terminals 122 and 127 by the balancing impedance transformer 130 and terminals 123 and 126 by the balancing impedance transformer 140.

The variable impedance presented by the secondary winding of the transformer 140 affects the transmission loss of the bridge 120. This loss is at a maximum when transformer 140 presents the same impedance to its arm of bridge 120 as is presented by the transformer 130 to its arm of bridge 120. The fixed balancing arm of bridge 120 is determined by a resistance 131 shunting windings 132 and 133 of transformer 130. Resistance 131 is of a fairly low value so that when a variable plate resistance shunting windings 142 and 143 of transformer 140 in a manner to be explained hereinafter is of a low value of resistance approaching that shunting the secondary winding of transformer 130, the bridge is in a near balance condition and the transmission loss between the input terminals 125 and 121 and the output terminals 124 and 128 of bridge 120 is at a maximum. This maximum may readily be set to a value as high as −50 db below the completely unbalanced or minimum loss condition. This is the maximum usable transmission loss due to the fact that losses greater than this value evince undesirable waveform distortion and frequency effects and also increase the sensitivity to inductive interference from surrounding A. C. fields.

The secondary terminals 124 and 128 of bridge 120 are of fairly high impedance and are connected to an adjustable attenuator 200 which may be varied in six-decibel steps from 0 to 24 db loss by a six-point switch 201. The switch 201 controls the number of resistors 202, 203, 204, 205, and 206 which are included in the conductor circuit. The last position of this attenuator is "off" or infinite attenuation.

*Output amplifier*

The signal from the attenuator 200 is connected to the grid of a triode amplifier 210 and is amplified by a fixed and stabilized gain accomplished by negative feedback through resistor 208, capacitor 209, and resistor 207.

The signal is then passed to the grid of a voltage amplifier pentode 220. This amplifier circuit is of the well known type in which the resonant circuit provided by a capacitor 228 and an inductor 234 is the load for the plate of pentode 220. The parallel impedance of this resonant circuit is high because it is tuned to resonance with the frequency applied to the grid.

After the second stage of the amplification the signal is applied to the outgoing line by inductor 235 of an impedance matching transformer 230. The internal impedance looking from the terminals of inductor 235 is about 600 ohms. The gain and plate resistance of pentode 220 are stabilized by a combination of negative current and voltage feedback. A variable resistor 223 is included in the feedback circuit and bias loop so that the gain of pentode 220 may be varied slightly over 6 db to permit gain increments between the 6 db steps of attenuator 200.

The feedback applied individually to voltage amplifier tubes 210 and 220 is sufficient to stabilize their gains over large changes in plate supply voltage and loss of activity of the two tubes by aging effects over their useful life.

*Gain increaser element*

Conductors 147 and 111 of Fig. 1, which are shunted across the junction of the low-pass filter 109 and high-pass filter 115, pass the signal to a transformer 150 which has a condenser 151 in series with the primary winding which reduces the transmission of low frequencies.

A double-triode 155 which follows the transformer 150 serves as a high gain voltage amplifier tube. A capacitor 152 and resistor 153 serve to bias the grids of tube 155 on high input signals to prevent overload. A resistance 154 and capacitor 156 combine to furnish a discrimination network to restrict the response of the gain increaser action above the frequency of 1500 cycles per second.

The double-triode 155 is resistance coupled by resistors 159 and 161 through capacitors 160 and 166 to a double-triode 165 which serves as a signal rectifier. A capacitor 158 serves as a frequency discriminator to restrict response of the gain increaser action above the 1500-cycle-per-second frequency. A capacitor 162 and resistor 163 serve to bias the grids of tube 165 to prevent overload. The signal level to this stage is controlled by double potentiometer volume controls 168*a* and 168*b* which set the signal threshold at which this stage operates. The cathodes of tube 165 are linked together and then connected through the primary of a coupling transformer 180 and thence to a current stabilized biasing divider 172—173 to ground. The bias of divider 172—173 is sufficient to cut off the plate current through tube 165. Thus plate current flows only when sufficient signal is impressed on the two grids of tube 165 in accordance with the setting of double potentiometer controls 168*a* and 168*b*.

The signal voltage impressed on one grid of tube 165 is displaced 180 degrees in phase to that on the other grid so that when the tube is made to conduct, two pulses of plate current flow in each complete signal cycle through the transformer 180. This current varies proportionately to the signal voltage on the grids.

The one-directional pulsating direct current from tube 165 passes through the low-impedance primary winding of transformer 180 to induce a voltage across its secondary winding. Due to the full-wave rectifying effect of tube 165, the voltage contains a component the crest and polarity of which is determined by the rate and direction of change of the primary direct current. This vestigial double frequency signal component is removed by a shunting capacitor 176 so that the transformer delivers a signal proportional to the syllabic level of the original voice signal to a rectifier tube 175.

The transformer 180 is poled so that an increase in primary current produces a negative voltage and a decrease in primary current produces a positive voltage across its secondary terminals. A series capacitor 177 connects the secondary of transformer 180 to the double diode rectifier tube 175, which is composed of two elements. The diode 175*a*—175*b* of tube 175 conducts when the voltage across the secondary of transformer 180 is positive, the current placing a positive charge on capacitor 177 on passing therethrough.

The other diode 175*c*—175*d* of tube 175 conducts only when impressed with a negative voltage from the secondary of the transformer 180. Under this condition a negative charging current flows from transformer 180 in series through the already positively charged capacitor 177 through the diode 175*c* and 175*d* and a capacitor 181. Thus, capacitor 177 imparts its charge to capacitor 181 and this results in a higher negative charge on capacitor 181 than would be obtained by the negative charging current from transformer 180 alone. This gives a voltage-doubling rectifier.

The negative charge on capacitor 181 which has discharging resistors 178 and 179 in shunt therewith is impressed on the two parallel grids of a pair of variable plate resistance tubes 185 and 195. This reduces the plate current flow of these tubes which decreases their static plate resistance across the terminals 142 and 143 of transformer 140. This in turn causes a further unbalance of the circuit of the bridge 120 and decreases its transmission loss or, conversely, increases the output to the voice frequency amplifier 210.

In the absence of signal pulses resistors 178 and 179 discharge the capacitor 181 the time constant being arranged for about 20 seconds. When the charge across the capacitor 181 is reduced to a static value of approximately one volt, determined by the contact potential of the diode 175*c*—175*d*, the plate current of tubes 185 and 195 reaches a maximum which is determined by this bias plus the bias generated across the cathode resistors 186 and 196 in parallel, 191 and 193 in parallel, and 192 to ground. The plate current of tubes 185 and 195 has an additional bias provided from a high voltage source (not shown) bled through a pair of resistors 184 and 187 via conductor 286.

The series resistor 193 which has a shunting resistor 191 is adjusted so that the transmission loss of the inductive bridge transformer 120 is at a nominal value of 20 decibels. This loss may be adjusted from zero loss to a maximum of 30 decibels loss by resistor 193.

The combination of bias voltage applied to tubes 185 and 195 is such that a further increase on the static negative charge of capacitor 181 to approximately 6 volts reduces the conduction of these tubes to zero. Their plate resistance is then infinite and the transmission loss through bridge 120 is at its minimum. Thus by setting this transmission loss to a value of 20 decibels, for instance, by adjusting the static plate resistance of tubes 185 and 195 by control resistor 193, an increase in output signal level, or a gain increasing action, is derived from the action of voice signals in the rectifying section of the gain increaser element.

Since the total range in input level of the device may exceed 40 decibels (for example, from a minimum signal level of −20 dbm to a maximum of +20 dbm, or a voltage ratio of 100 times) the grids of tubes 155 and 165 may be driven positive during signal peaks at a high level. This is provided against by allowing the resulting grid current to flow through high-resistance grid leaks and condenser combinations (capacitor 152 and resistor 153 for tube 155 and capacitor 162 and resistor 163 for tube 165). The charge across these circuits maintains a high bias on the respective tube grids thus preventing excessive plate current from injuring the tubes. At the same time, an excessive amount of negative charge on capacitor 181 will not be stored during high signal level peaks with the attendant excessive delay in discharge down to the threshold charge or bias for tubes 185 and 195.

The capacitor 158 restricts the transmission of unnecessary high frequency speech or noise components from amplifier tube 155 so that only the portion of speech containing the proper syllabic energy is passed for rectification and control. The system may then discriminate against random input line noises and only respond to actual speech syllables. A steady-state buzz or tone will not actuate the bias control rectifier combination of tube 175 and capacitor 181.

The biasing voltage stored in capacitor 181 and applied between the grids of tubes 185 and 195 and ground is negative so that once sufficient voltage is generated at this point the tubes will cut off and no further increase in this negative bias can result in any further change in operation of tubes 185 and 195. Therefore, the desired control effects from the plate resistance of tubes 185 and 195 are held within sharply defined limits.

Negative or inverse voltage feedback is used on the control tubes 185 and 195 to reduce to a negligible value internal tube noises or microphonics that might otherwise be injected into the bridge transformer, as well as eliminate any vestige of plate power supply hum.

*Gain decreaser element*

The gain decreaser element may be termed a reverse acting circuit in that the output voltage of the amplifier is sampled and rectified to control the amplifier input voltage and thus maintain the transmission of the system at a constant level. The input to this element is coupled to the plate of amplifier tube 220 by a blocking capacitor 229 and threshold control potentiometer 241.

After attenuation by control potentiometer 241 the signal is amplified by a double triode, one element of which is used as a unity-gain phase inverter. A transformer 250 couples the output voltage from the plates of the tube 240 at the proper impedance value to a full-wave rectifier double-diode 260. The rectifier tube 260 has a delay bias obtained from a voltage divider resistor 261 and resistor 262 so that it will conduct until the signal peaks applied to its diode plates exceed the delay bias.

The delay bias causes a very sharply controlled charging current to be impressed across a capacitor 264 which smooths the signal frequency components and retains a negative charge across the resistor 265-capacitor 264 combination directly proportional to the input signal level set by control resistor 241. The resistor 265-capacitor 264 combination has a time constant of 1 second. The negative charge on resistor 265 is applied to the grids of the paralleled triode sections of a direct current phase inverter tube 270. With increase in negative bias from capacitor 264 tube 270 will pass less and less plate current. This plate current is passed from the cathode of tube 270 through a push-button switch 198 to a biasing resistor string composed of resistors 271, 272, and 273, and the series-parallel combination of resistors 274, 275, and 276 to ground.

A discharging resistor 265 is connected to the junction of resistors 271 and 272 to provide a fixed static bias from resistor 271 for the static plate current of tube 270 in order to limit its plate current to a safe value in the absence of a negative controlling bias from the gain decreaser control rectifier. This static plate current through the bias string of resistors 271, 272, 273, 274, 275, and 265 develops enough bias voltage to cut off the conduction of a pair of variable plate resistance tubes 280 and 290 since their cathodes are connected in parallel with those of tube 270.

When the signal, as controlled and set by resistor 241, supplied from amplifier tube 240 is sufficient to overcome the delay bias on rectifier diodes 260 a negative charge is placed on capacitor 264 and the grids of tube 270, thereby reducing the plate current of tube 270 in linear proportion. With reduced plate current flowing through the direct current phase inverter 270 a reduced bias is applied to tubes 280 and 290, allowing them to conduct in an essentially linear proportion to the negative bias across capacitor 264. From this plate conduction its inverse complement, plate resistance, is shunted across the terminals 142—143 of transformer 140 thus tending to approach the balanced condition of bridge transformer 120 necessary to increase the transmission loss and thus reduce the signal applied to the output amplifier.

The threshold input control potentiometer 241 is set so that the diodes of tube 260 are just starting to conduct at the level desired from the output amplifier. This level may be set for any value from —10 dbm to a maximum of +10 dbm as determined by the over-all gain control 200 and resistor 223.

Negative or inverse voltage feedback is used on the control tubes 280 and 290 to reduce to a negligible value internal tube noises or microphonics that might otherwise be injected into the bridge transformer 120 and also to eliminate any vestiges of plate power supply hum.

*Balancing circuit*

The balancing circuit comprises a two-winding relay 195 and two push-button switches 197 and 198. When either of these switches is closed the relay 195 closes and opens at a vibratory rate of 18 to 20 times a second, opening and closing the circuits of switch 197 or 198 at contacts 97. For example, the manipulation of push-button 198*d* closes contacts 198*a*, 198*b*, and 198*c* of switch 198. Ground is furnished through 198*a* and contacts 96 for energization of the upper winding of relay 195 and at the same time a charge collects on capacitor 98. There is a short time interval while capacitor 98 is being charged before relay 195 operates. As soon as the relay is operated contacts 96 open to break the ground connection. However, the discharge of capacitor 98 maintains relay 195 operated for a short time interval; after which contacts 96 close to begin the cycle anew. It is the charging and discharging of capacitor 98 which slows down the vibrating rate to about 20 cycles per second.

When contacts 97 of relay 195 are closed a circuit is completed through contacts 198*b* and 198*c* to the cathodes of tubes 270, 280, and 290. When contacts 97 are open this circuit is broken. The making and breaking of these contacts allows the plate current of the control tubes to pulsate at the 20-cycle-per-second rate and balance control resistors 196 or 276, whichever apply, are adjusted for minimum spurious clicks or noise in the amplifier output.

In essence, the device of this invention comprises a voice signal amplifier which is aided by two auxiliary circuits. One of these auxiliary circuits is the gain increaser element which acts to increase the incoming signal to a predetermined level. The other auxiliary circuit is the gain decreaser element which tests the strength of the outgoing signal and acts to decrease it to a predetermined level. In this fashion the over-all system gain will be maintained at a nearly constant level. With a 40 db compression taking place in the gain reducer element, the output of the amplifier element to the line increases by only 2 db, or a decibel compression ratio of 20 to 1.

In all cases in the foregoing the term "dbm" refers to a definite level above or below a standard level ("0" dbm) which is 1 milliwatt of power in a load impedance of 600 ohms at 1000 cycles per second fixed pure tone. Voice energy levels should be termed "volume units" or "VU" and are to be set for a peak level 4 to 6 decibels lower, as read on a standard volume indicator (Weston model #862 model #30A), where "OVU" on this meter is calibrated by a steady state power level of +4 dbm, or 1.225 volts, 1000 c. p. s., 600 ohms.

The power source for heating the filaments of the tubes is not shown in the drawings in order to minimize the circuit lines and make neater appearing drawings. This filament power may be provided from any convenient source such as 6.3-volt alternating current and all of the filaments may be heated from a single source.

While the values of the various resistors and capacitors may be varied considerably without interfering seriously with the operation of the device typical values of the various parts are given in the following table opposite the numbers of these parts shown on the drawings.

| Part No. | Capacity | Part No. | Capacity |
|---|---|---|---|
| 98 | 5 mfd 150 DCWV. | 183 | 0.025 mfd. 600 v. |
| 104 | 0.025 mfd. 600 v. paper. | 189 | 0.025 mfd. 600 v. |
| 105 | 0.05 mfd. 200 v. paper. | 199 | 0.05 mfd. 200 v. |
| 106 | 0.15 mfd. 600 v. paper. | 209 | 0.5 mfd. 500 v. |
| 107 | 0.025 mfd. 600 v. paper. | 213 | 25 mfd. 25 DCWV. |
| 108 | 0.05 mfd. 200 v. paper. | 214 | 100 mmfd. 500 v. |
| 114 | 1.0 mfd. 500 v. | 216 | 0.01 mfd. 600 v. paper. |
| 144 | 0.05 mfd. 200 v. | 218 | 20 mfd. 450 DCWV. |
| 151 | 0.5 mfd. 500 v. | 224 | 2.0 mfd. mfd. 500 v. |
| 152 | 0.1 mfd. 400 v. paper. | 225 | 1.0 mfd. 500 v. |
| 156 | 250 mmfd. 500 v. mica. | 226 | 20 mfd. 450 DCWV. |
| 158 | 0.0005 mfd. 500 v. mica. | 228 | 0.005 mfd. 500 v. |
| 160 | 0.01 mfd. 600 v. paper. | 229 | 0.05 mfd. 600 v. |
| 162 | 0.05 mfd. 200 v. | 242 | 0.02 mfd. 200 v. |
| 164 | 20 mfd. 450 DCWV. | 246 | 0.05 mfd. 600 v. |
| 166 | 0.01 mfd. 600 v. paper. | 263 | 50 mfd. 50 DCWV. |
| 170 | 80–10 mfd. 450 DCWV. | 264 | 1.0 mfd. 500 v. |
| 173 | 50 mfd. 50 DCWV. | 266 | 0.15 mfd. 600 v. |
| 176 | 0.1 mfd. 500 v. | 281 | 0.1 mfd. 600 v. |
| 177 | 2.0 mfd. 500 v. | 282 | 500 mfd. 15 v. |
| 181 | 1.0 mfd. 500 v. | 292 | 0.1 mfd. 600 v. |

| Part No. | Resistance | Part No. | Resistance |
|---|---|---|---|
| 99 | 200 ohms. | 204 | 6,000 ohms. |
| 117 | 400 ohms. | 205 | 3,000 ohms. |
| 118 | 50 ohms. | 206 | 3,000 ohms. |
| 119 | 250 ohms. | 207 | 150,000 ohms. |
| 131 | 820 ohms. | 208 | 390,000 ohms. |
| 134 | 5,000 ohms. | 211 | 10,000 ohms. |
| 153 | 5.6 megohms. | 212 | 2,700 ohms. |
| 154 | 270,000 ohms. | 215 | 270,000 ohms. |
| 157 | 1,500 ohms. | 217 | 560,000 ohms. |
| 159 | 270,000 ohms. | 221 | 120 ohms. |
| 161 | 270,000 ohms. | 222 | 400 ohms. |
| 163 | 4.7 megohms. | 223 | 750 ohms. |
| 167 | 10,000 ohms. | 227 | 10,000 ohms. |
| 168*a* and 168*b*. | 250,000 ohms. | 231 | 1,000 ohms. |
| | | 241 | 250,000 ohms. |
| 171 | 4,700 ohms. | 243 | 560,000 ohms. |
| 172 | 2,200 ohms. | 244 | 1,200 ohms. |
| 174 | 27,000 ohms. | 245 | 18,000 ohms. |
| 178 | 10 megohms. | 247 | 330,000 ohms. |
| 179 | 10 megohms. | 248 | 3,300 ohms. |
| 182 | 270,000 ohms. | 261 | 82,000 ohms. |
| 184 | 33,000 ohms. | 262 | 22,000 ohms. |
| 186 | 270 ohms. | 265 | 1,000,000 ohms. |
| 187 | 33,000 ohms. | 271 | 470 ohms. |
| 188 | 270,000 ohms. | 272 | 270 ohms. |
| 191 | 1,200 ohms. | 273 | 470 ohms. |
| 192 | 200 ohms. | 274 | 270 ohms. |
| 193 | 1,000 ohms. | 275 | 270 ohms. |
| 194 | 8,200 ohms. | 276 | 200 ohms. |
| 196 | 500 ohms. | 277 | 270,000 ohms. |
| 202 | 24,000 ohms. | 291 | 270,000 ohms. |
| 203 | 12,000 ohms. | | |

| Part No. | Value or Mfg. Co. |
|---|---|
| 102 | 54 ml. |
| 103 | 54 ml. |
| 115 | Repeat Coil A. E. Co. 4D-281596-A. |
| 120 | Hybrid Coil A. E. Co. D-282922-B. |
| 130 | UTC LS-51 30,000 to 600 ohms. |
| 140 | UTC LS-51 30,000 to 600 ohms. |
| 150 | Thordarson T-1A73. |
| 180 | Thordarson T-1A73. |
| 230 | A. E. Co. D-283694. |
| 250 | Thordarson T20A25. |

| Part No. | Type | Part No. | Type |
|---|---|---|---|
| 155 | 6SL7 | 220 | 6SK7 |
| 165 | 6SN7 | 240 | 6SN7 |
| 175 | 6H6 | 260 | 6H6 |
| 185 | 6J5 | 270 | 6SN7 |
| 195 | 6J5 | 280 | 6J5 |
| 210 | 6SF5 | 290 | 6J5 |

The relay 195 is a two-section 500/500 ohm coil with short armature and spring pileup such as is found in A. E. Co. D.–280209.

The push-button switches 197 and 198 are non-locking and may be of a type such as Yaxley #2006 to which an additional contact has been added.

In operation the incoming signal leads are connected to conductors 100 and 101 and the outgoing leads to conductors 232 and 233. A source of high-voltage (for example, 220 volts) is provided for conductor 286 and the filaments of all the tubes are provided with a filament current such as 6.3 volts A. C. Gain control element 200 controls the gain in steps of six decibels. The rough setting of the desired gain is made by adjusting this element. Variable resistor 223 is then used for fine adjustment of the gain within a six-decibel span. Potentiometers 241 and 168 (*a* and *b*) are then set for the desired increase and decrease. Final adjustment of the control tube plate current is then made with balance control 196 while push button 197 is closed and with balance control 276 while push button 198 is closed.

While a particular embodiment of the invention has been illustrated, it is to be understood that numerous modifications in the details of arrangement may be resorted to without departing from the true spirit and scope of the invention as defined in the amended claims.

I claim as my invention:

1. A constant level electric signal amplifier comprising in combination electric signal conducting means, a hybrid-winding mutual-inductance bridge transformer through which said signal is passed, an adjustable balancing circuit for controlling the strength of the electric signal passing through said bridge transformer, an electronic amplifying circuit coupled to said bridge transformer, a gain increaser element connected across said electric signal conducting means near the incoming signal point, said gain increaser element including a potentiometer input level control and having electron tube rectifying means in which voltage-doubling action is achieved by two diode elements the anode of one of which is connected in parallel with the cathode of the other, the remaining cathode being grounded and the output of the remaining anode being amplified by a pair of electron control tubes connected in push-pull relationship, the plate currents of which are passed through the said adjustable balancing circuit to set the strength of the incoming electric signal to a predetermined level, a gain decreaser element connected across said electric signal conducting means near the outgoing signal point, said gain decreaser element including a potentiometer input level control and having a pair of electron control tubes connected in push-pull relationship and responsive to the received outgoing electric signal, the plate current of said electron tubes means being passed through the said adjustable balancing circuit to set the strength of the outgoing electric signal to a predetermined level, balancing controls for balancing said pairs of control tubes, and a pulsing relay controlling the plate circuits of the control tubes of said gain increaser and gain decreaser elements whereby the balancing controls for said elements may be adjusted to give minimum interference with the electric signal.

2. In a constant-level voice-operated signal amplifier, two electric voice signal incoming conductors, a hybrid-winding mutual-inductance bridge transformer comprising four primary windings and a secondary winding inductively coupled, one terminal of a first and one terminal of a second of said four primary windings being connected in common to one incoming voice signal conductor and one terminal of a third and one terminal of a fourth of said four primary windings being connected in common to the other incoming voice signal conductor, said first winding being connected by its other terminal through the primary winding of a first balancing impedance transformer to the other terminal of said third winding, the terminals of said first and third windings being connected for opposed current induction, said second winding being connected by its other terminal through the primary winding of a second balancing impedance transformer to the other terminal of said fourth winding, the terminals of said second and fourth windings being connected for opposed current flow, said secondary winding of said bridge transformer being connected to an electron tube voice signal amplifying circuit, an outgoing circuit connected to the output of said amplifying circuit, means for fixing the impedance presented to the bridge by said first balancing impedance transformer, and a second means for adjusting the impedance presented to the bridge by said second balancing impedance transformer, said second means comprising a gain increaser element connected across said electric voice signal incoming conductors, said gain increaser element including an electron tube amplifying circuit with a potentiometer input level control, and electron tube rectifying means in which voltage-doubling action is achieved by two diode elements the anode of one of which is connected in parallel with the cathode of the other, the remaining cathode being grounded and the output of the remaining anode being further amplified by an electron tube the plate current of which is passed through the secondary winding of the said second balancing impedance transformer in order to vary the impedance presented to the bridge thereby to thereby adjust the balance of said bridge to give an electric voice signal of predetermined strength, said second means further comprising a gain decreaser element connected to said outgoing circuit including a potentiometer input level control and having electron tube means responsive to the outgoing signal, the plate current of said electron tube means being passed through the secondary winding of the said second balancing impedance transformer in order to vary the impedance presented to the bridge thereby to thereby adjust the balance of said bridge to give an electric voice signal of predetermined strength.

3. In a constant-level voice-operated signal amplifier, electric signal incoming conductors, a hybrid-winding mutual-inductance bridge transformer comprising four primary windings and a secondary winding inductively coupled, one terminal of a first and one terminal of a second of said four primary windings being connected in common to one incoming voice signal conductor and one terminal of a third and one terminal of a fourth of said four primary windings being connected in common to another incoming voice signal conductor, said first winding being connected by its other terminal through the primary winding of a first balancing impedance transformer to the other terminal of said third winding, the terminals of said first and third windings being connected to oppose the inductive effect of each other, said second winding being connected by its other terminal through the primary winding of a second balancing impedance transformer to the other terminal of said fourth winding, the terminals of said second and fourth windings being connected to oppose the inductive effect of each other, the secondary winding of said bridge transformer being connected to the input of an electron tube voice signal amplifying circuit, means for fixing the impedance presented to the bridge by said first balancing impedance transformer, and means for automatically adjusting the impedance presented to the bridge by said second balancing impedance transformer.

4. In a constant-level voice-operated signal amplifier, electric signal incoming conductors, a hybrid-winding mutual-inductance bridge transformer comprising five coupled windings, a first and second of said windings being connected in parallel to one incoming voice signal conductor and a third and fourth of said windings being connected in parallel to another incoming voice signal conductor, said first winding being connected through the primary winding of a first balancing impedance transformer to the said third winding, the terminals of said first and third windings being connected to oppose the inductive effect of each other, said second winding being connected through the primary winding of a second balancing impedance transformer to the said fourth winding, the terminals of said second and fourth windings being connected to oppose the inductive effect of each other, a fifth of said windings being connected to the input of an electron tube voice signal amplifying circuit, an outgoing circuit connected to the output of said amplifying circuit, means for fixing the impedance presented to the bridge by said first balancing impedance transformer, a gain increaser element connected between the incoming conductors and the secondary winding of said second balancing impedance transformer, said gain increaser element including a potentiometer input level control and having electron tube rectifying means in which voltage-doubling action is achieved by two diode elements the anode of one of which is connected in parallel with the cathode of the other, the remaining cathode being grounded and the output of the remaining anode being amplified by an electron tube the plate current of which is passed through the said secondary winding of said second balancing impedance transformer in order to change the impedance thereof presented to the bridge thereby, and a gain decreaser element connected between said outgoing circuit and the said secondary winding of said second balancing impedance transformer.

5. In a gain control system, a signal line including an incoming end and an outgoing end, a transformer connected in said line and inductively coupling the incoming and outgoing ends thereof comprising four primary windings and a secondary winding in inductive relation to said four primary windings, a first balancing transformer comprising a primary winding and a second winding, a first circuit connected across said line at said incoming end including a first and a second ones of said four primary windings and the primary winding of said first balancing transformer all connected in series, said first and second windings being connected in inductive opposition to each other, a second circuit connected across said line at said incoming end parallel to said first circuit including a third and a fourth ones of said four primary windings and the primary winding of said second balancing transformer all connected in series, said third and fourth primary windings connected in inductive opposition to each other, said four primary windings and said primary windings of said first and second balancing transformers forming a bridge circuit across said signal line at the incoming end, means including the secondary winding of said first balancing transformer for changing the balance of said bridge circuit by means of said primary winding of said first balancing transformer, gain increaser means associated with the incoming end of said line for increasing the gain of the signals on said line comprising a vacuum tube, the plate resistance of which varies in response to variation of incoming signals on the line, gain decreaser means associated with the outgoing end of said line for decreasing the gain of the signals in said line comprising a second vacuum tube, the plate resistance of which varies in response to variation of outgoing signals on the line, and circuit means including the secondary winding of said second balancing transformer and the plate circuits of said gain increaser tube and said gain decreaser tube for further changing the balance of said bridge by means of said primary winding of said second balancing transformer responsive to plate resistance changes in said tubes.

EDMUND H. ROSS.

REFERENCES CITED

The following references are of record in the file of this patent:

UNITED STATES PATENTS

| Number | Name | Date |
|---|---|---|
| 1,997,222 | Lewis et al. | Apr. 9, 1935 |
| 1,997,223 | Martin | Apr. 9, 1935 |
| 2,204,578 | Davis | June 18, 1940 |
| 2,251,594 | Mayne | Aug. 5, 1941 |
| 2,285,794 | Barney | June 9, 1942 |
| 2,432,878 | Frederick et al. | Dec. 16, 1947 |